(12) United States Patent
Reaume

(10) Patent No.: US 12,135,545 B2
(45) Date of Patent: Nov. 5, 2024

(54) SYSTEMS AND METHODS FOR AUTOMATICALLY SCHEDULING MAINTENANCE

(71) Applicant: Caterpillar Inc., Peoria, IL (US)

(72) Inventor: Daniel J. Reaume, Midland, MI (US)

(73) Assignee: Caterpillar Inc., Peoria, IL (US)

( * ) Notice: Subject to any disclaimer, the term of this patent is extended or adjusted under 35 U.S.C. 154(b) by 761 days.

(21) Appl. No.: 17/219,661

(22) Filed: Mar. 31, 2021

(65) Prior Publication Data

US 2022/0317676 A1 Oct. 6, 2022

(51) Int. Cl.
| | |
|---|---|
| G05B 23/02 | (2006.01) |
| G06N 20/00 | (2019.01) |
| G06Q 10/0631 | (2023.01) |
| G06Q 10/0635 | (2023.01) |
| G06Q 10/20 | (2023.01) |

(52) U.S. Cl.
CPC ......... *G05B 23/0283* (2013.01); *G06N 20/00* (2019.01); *G06Q 10/06312* (2013.01); *G06Q 10/0635* (2013.01); *G06Q 10/20* (2013.01)

(58) Field of Classification Search
CPC ............ G06N 20/00; G06N 5/01; G06N 7/01; G06Q 10/06311; G06Q 10/06312; G06Q 10/0635; G06Q 10/109; G06Q 10/20
See application file for complete search history.

(56) References Cited

U.S. PATENT DOCUMENTS

| | | | |
|---|---|---|---|
| 7,457,762 B2 | 11/2008 | Wetzer et al. | |
| 7,496,475 B2 | 2/2009 | Byrne et al. | |
| 8,660,875 B2 | 2/2014 | Yedatore et al. | |
| 10,466,689 B2 | 11/2019 | Adendorff et al. | |
| 2011/0137697 A1* | 6/2011 | Yedatore | G06F 11/0748 702/184 |
| 2015/0324759 A1* | 11/2015 | Bansal | G05B 23/0283 702/184 |
| 2017/0264882 A1* | 9/2017 | Helberg | G01B 11/22 |
| 2019/0155360 A1* | 5/2019 | Anders | G06F 1/3209 |
| 2019/0344466 A1* | 11/2019 | Vandergon | G01K 1/143 |
| 2020/0034734 A1 | 1/2020 | Agrawal et al. | |
| 2020/0265331 A1 | 8/2020 | Tashman et al. | |
| 2021/0003524 A1* | 1/2021 | Passaniti | G01N 33/0063 |

(Continued)

OTHER PUBLICATIONS

Schwartz et al. "Development of an Automatic Engine Oil-Change Indicator System," Feb. 1987, SAE Technical Paper Series, Detroit, Michigan, 20 pgs.

(Continued)

*Primary Examiner* — Michael J Dalbo

(57) ABSTRACT

Systems and methods for scheduling maintenance of equipment include collecting pre-emptive maintenance data associated with a pre-emptive maintenance task associated with a component of equipment, collecting preventive maintenance data associated with a scheduled preventive maintenance task associated with the component or another component, applying a model to predict a failure time value associated with a future failure of the component, analyzing the data and the time value to determine an optimal time to perform a maintenance event, and using that optimal time to schedule the next maintenance event. Determining the optimal time includes minimizing a total cost of the maintenance.

21 Claims, 5 Drawing Sheets

(56) References Cited

U.S. PATENT DOCUMENTS

2022/0058590 A1\* 2/2022 Phan ................ G06Q 10/06312
2022/0100187 A1\* 3/2022 Isik .......................... G06N 3/08

OTHER PUBLICATIONS

Bommareddi, Anveshan, "An Engine Oil Life Algorithm," Dec. 2009, The Pennsylvania State University, Dept. of Mechanical and Nuclear Engineering, 103 pgs.

\* cited by examiner

SYSTEMS AND METHODS FOR AUTOMATICALLY SCHEDULING MAINTENANCE

TECHNICAL FIELD

The present disclosure relates to systems and methods for scheduling maintenance, including automatically optimizing timing of maintenance of a machine or equipment.

BACKGROUND

Equipment (such as machines or vehicles) often requires time-based or scheduled maintenance, which may include repair or replacement of components with known lifespans that is performed at intervals, which may be measured in hours or miles of operation, or other suitable intervals. Scheduled maintenance often involves removing the equipment from service for a period of time to perform the maintenance. Costs associated with scheduled maintenance may include the costs associated with the maintenance itself (for example, parts and labor) and costs associated with lost productivity due to the equipment being out of service. Time-based or scheduled maintenance may also be referred to as preventive maintenance. Some examples of scheduled or preventive maintenance may include oil changes, tire replacement, battery replacement, engine tune-ups, or other maintenance activities that are performed periodically for general upkeep of the equipment.

Equipment may also require unscheduled maintenance, which may include condition-based maintenance and reactive maintenance (i.e., maintenance that results from a need arising from a problem or a condition). Unscheduled maintenance may involve repair or replacement of components that wear or break at variable rates because of varying environmental conditions or other variable factors. Unscheduled maintenance may also involve preventive maintenance tasks that need to be performed earlier than their normally-scheduled interval due to unusual or unpredictable conditions. Because unscheduled maintenance generally avoids an impending failure, it may be referred to as pre-emptive maintenance. Sensors and other technologies known in the art have enabled advance warning of impending component failures and have enabled predictions of the remaining useful life of components via mathematical modeling.

Like scheduled maintenance, costs associated with unscheduled maintenance may include the costs associated with the maintenance itself (i.e., parts and labor) and costs associated with lost productivity. In addition, the unscheduled nature of some maintenance issues may increase the costs associated with these maintenance issues. For example, if an unscheduled maintenance issue requires resolution at a point in time that does not correspond with a scheduled maintenance interval, operators may need to take equipment out of service more often than expected or desired.

Removing equipment from service may also involve setup costs, such as the costs associated with reaching the component in need of repair or replacement. In a specific example, some maintenance tasks (both scheduled and unscheduled) may involve temporarily removing an engine from equipment to repair or replace a component of the engine. It is more efficient to repair or replace multiple components of an engine at once while it is removed from the equipment than it is to remove the engine from the equipment on multiple separate occasions for each maintenance issue. Accordingly, it is generally more cost-efficient and time-efficient to perform multiple maintenance tasks during the same maintenance session, especially if they involve the same systems or subsystems.

One way to perform multiple maintenance tasks at once is to perform scheduled maintenance when the equipment is undergoing unscheduled maintenance. For example, if a component has failed or is likely to fail at 450 hours, and the next scheduled maintenance interval is at 500 hours, it may be efficient to perform the 500-hour scheduled maintenance while the equipment is out of service for the unscheduled maintenance. Performing both scheduled and unscheduled maintenance tasks during the same service session may be called "batching" maintenance actions in a single maintenance event. One downside to batching maintenance actions is that it may involve prematurely replacing components (that would have otherwise been replaced at a later scheduled maintenance event), which sacrifices some of the value or remaining useful life of the components. When components are expensive or numerous, this lost value may be substantial. Another complication to batching maintenance actions is that components and resources for scheduled maintenance may not be available at the same time as the unscheduled maintenance.

Efforts have been made to optimally schedule maintenance events. For example, U.S. Pat. No. 8,660,875 (hereinafter, Yedatore) purports to create an optimal schedule for maintaining a tool based on known scheduled maintenance actions and predicted failure events, in order to minimize downtime, by scheduling actions together that would otherwise occur at different times. However, Yedatore's system, which prioritizes minimization of down time, fails to consider losses or waste due to premature replacement or repair of components.

Accordingly, there remains a need for using data from sensors and condition monitors to automatically and/or optimally schedule maintenance events in order to minimize costs and/or to minimize premature replacement of components. Systems and methods according to embodiments of the present technology, as described herein, and variants thereof, are directed toward overcoming one or more of the deficiencies described above.

SUMMARY

In some embodiments, a method for scheduling maintenance of equipment includes collecting pre-emptive maintenance data associated with a pre-emptive maintenance task associated with a component of equipment, collecting preventive maintenance data associated with a scheduled preventive maintenance task associated with the component or with another component, applying a model to predict a failure time value associated with a future failure of the component, analyzing the data and the time value to determine an optimal time to perform a maintenance event, and using that optimal time to schedule the next maintenance event. Determining the optimal time can include minimizing a total cost of the maintenance. In some aspects, methods include developing the models.

In some embodiments, a system for scheduling maintenance of equipment includes one or more processors and one or more memory devices having stored thereon instructions that, when executed by the one or more processors, cause the one or more processors to collect component data associated with a first component of the equipment; collect pre-emptive maintenance data associated with a pre-emptive maintenance task associated with the first component; collect preventive maintenance data associated with a future scheduled preventive maintenance task; apply one or more mathematical models to the component data to predict a failure time value associated with a future failure of the first component based on the component data; and analyze the pre-emptive maintenance data, the preventive maintenance data, and the failure time value to determine an optimal time to perform a maintenance event that includes the preventive maintenance task and the pre-emptive maintenance task. In some aspects, the instructions further input the optimal time to a timetable system to schedule the next maintenance event. In some aspects, determining the optimal time includes minimizing a total cost of the maintenance. In some aspects, the preventive maintenance data includes costs associated with replacing a second component prior to the future scheduled preventive maintenance task.

Some embodiments include one or more non-transitory computer-readable media storing computer-executable instructions that, when executed by one or more processors, cause the one or more processors to perform operations including collecting component data associated with a first component of the equipment; collecting pre-emptive maintenance data associated with a pre-emptive maintenance task associated with the first component; collecting preventive maintenance data associated with a future scheduled preventive maintenance task; applying one or more mathematical models to the component data to predict a failure time value associated with a future failure of the first component based on the component data; and analyzing the pre-emptive maintenance data, the preventive maintenance data, and the failure time value to determine an optimal time to perform a maintenance event that includes the preventive maintenance task and the pre-emptive maintenance task. In some aspects, the operations include inputting the optimal time to a timetable system to schedule the next maintenance event. In some aspects, the preventive maintenance data includes costs associated with replacing a second component prior to the future scheduled preventive maintenance task. In some aspects, determining the optimal time includes minimizing a total cost of the maintenance.

Other aspects will appear hereinafter. The features described herein can be used separately or together, or in various combinations of one or more of them.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
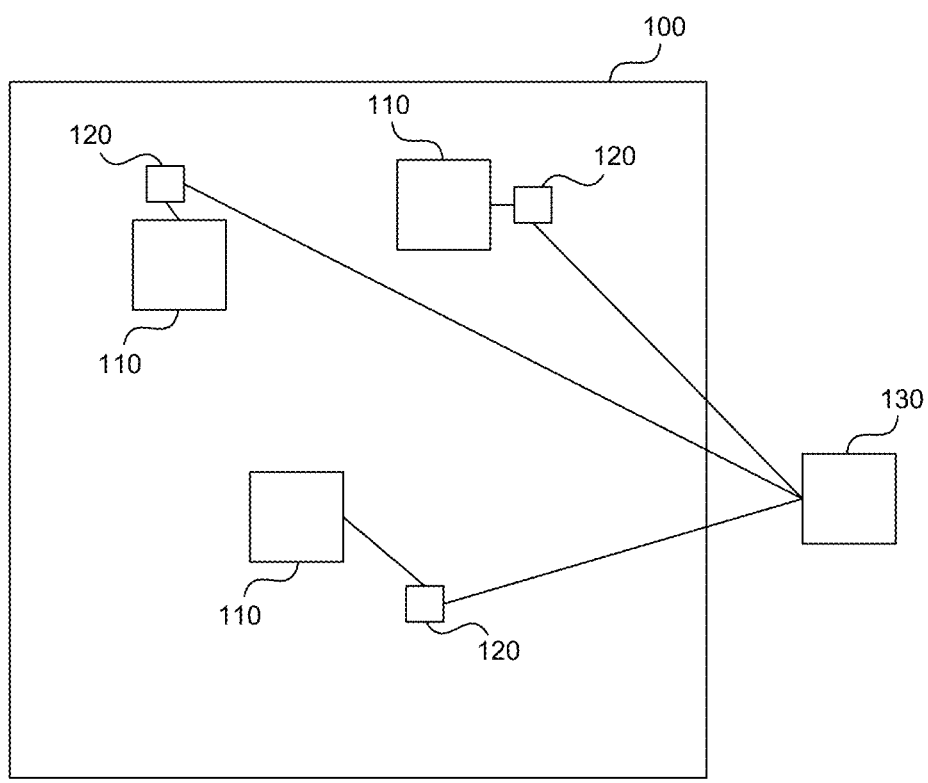
FIG. 1 is a schematic illustration of equipment, which includes one or more components functioning together or independently to perform activities associated with the equipment.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

DETAILED DESCRIPTION

Various embodiments of the present technology will now be described in further detail. The following description provides specific details for a thorough understanding and enabling description of these embodiments. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. Accordingly, embodiments of the present technology may include additional elements or exclude some of the elements described below with reference to the Figures, which illustrate examples of the technology.

The terminology used in this description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such.

Disclosed are methods and systems for automatically scheduling maintenance of equipment by, in part, predicting (or at least estimating) a time of failure of a component of equipment and determining an optimal time to perform a maintenance event, which may include pre-emptive maintenance to prevent failure of the component and/or preventive/scheduled maintenance. The optimal time considers, among other aspects, the cost of performing a preventive maintenance task early (i.e. the losses or waste associated with performing the preventive maintenance task before a component's useful life is over). Systems and methods according to various embodiments of the present technology minimize costs under the real-world constraints of downtime, part availability, repair bay availability, personnel availability, loss of useful component life, and other factors described in further detail below. Equipment may include trucks, tracked-type tractors, excavators, wheel loaders, front-end loaders, vehicles, and other equipment.

FIG. 1 is a schematic illustration of equipment 100, which includes one or more components 110 functioning together or independently to perform activities associated with the equipment 100. For example, the equipment 100 is a machine with components 110 including an engine (and components thereof), a transmission, input devices (such as steering components), tires, tracks, hydraulic systems, and other components. The equipment 100 may be subject to regularly scheduled maintenance based on a selected number of hours of operation or units of distance driven. The equipment 100 may also be subject to unscheduled maintenance events, such as repair or replacement of components that wear or break at variable rates because of varying environmental conditions or other variable factors.

In an embodiment, the equipment 100 includes one or more sensors 120 connected to and/or otherwise arranged to observe the one or more components 110 in order to analyze the components 110. The sensors 120 may provide sensor data associated with characteristics of the components 110, such as characteristics associated with damage, wear, weakening, or failure of the components 110. The sensors 120 may include, or may be connected to, one or more computing devices 130. The sensors 120 and the one or more computing devices 130 may work with each other to provide signals or information comprising advance warning of present or future component failures and predictions of the remaining useful life of components via mathematical modeling, according to aspects of the prior art.

Embodiments of the present technology (systems and methods) collect data regarding present or future component failures, the costs and/or downtime associated with pre-emptive repair or replacement of the components, upcoming scheduled preventive maintenance (such as the costs and/or downtime associated with such preventive maintenance), and, using the data, calculating the optimal time to schedule the next maintenance event, which may include a combination of one or more pre-emptive repairs and one or more preventive maintenance tasks. In some embodiments, the present technology optimizes (for example, minimizes) waste associated with prematurely replacing a component while also optimizing (for example, minimizing) equipment downtime over the life of the equipment.

Figure 2:
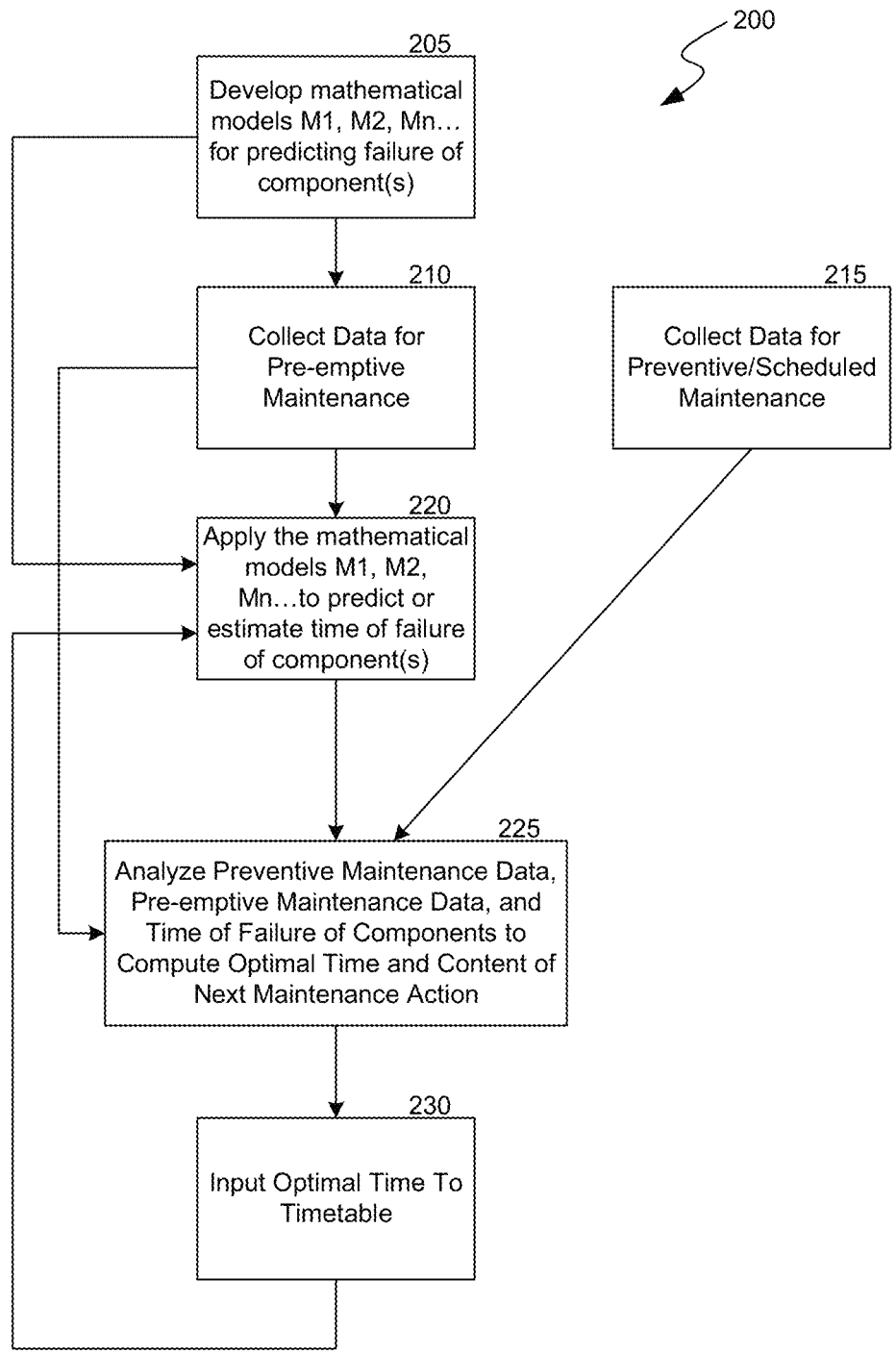
FIG. 2 is a flow diagram illustrating a method for scheduling maintenance of a piece of equipment having one or more components.

FIG. 2 is a flow diagram illustrating a method 200 for scheduling maintenance of a piece of equipment 100 having one or more components 110, in accordance with embodiments of the present technology. Beginning at step 205, the method may include developing one or more mathematical models, each of which predicts a time value associated with expected (future) failure of one or more components 110 of the equipment 100, such as a time until and/or a time of the expected failure. For purposes of this disclosure, the time value can be a specific time and/or a predicted distribution of time, such as a mean failure time value and a standard deviation from the mean time value (e.g., in a specific non-limiting example, a mean failure time value may be 1000 hours of operation and the standard deviation may be 100 hours) of operation.

The models are configured to predict the time value based on component data associated with the components 110 of the equipment 100, which may be derived from the sensors 120 or other sources. For example, the component data may include indicators of wear, fracture, resistance, or other suitable indicators. In some specific examples, component data may include the pressure drop across a filter (such as an oil or coolant filter) to indicate how clogged it is, levels of fluids (such as engine oil, transmission oil, coolant), engine temperature, engine hours of operation, or other component data.

Modeling and predicting expected failure of components is known in the art, so suitable modeling and prediction techniques may be implemented to develop the mathematical models. The method 200 may include developing multiple mathematical models, each representative of a failure mode of a component (some components may have multiple failure modes). In some embodiments, the models may include rule-based models, machine-learning (including artificial intelligence or "AI") models, or ensemble models combining two or more other models. Accordingly, the method 200 may include developing a portfolio of mathematical models M1, M2, Mn, etc., each of which predicts the time until expected failure of a component.

At step 210, the method may include collecting pre-emptive maintenance data for pre-emptive maintenance tasks associated with the one or more components 110 for which a mathematical model was developed in step 205. For example, the pre-emptive maintenance data may include the content of the maintenance task (such as the type of maintenance work to be performed, including repair or replacement), the costs associated with the maintenance task (such as parts and labor), and/or the time associated with the maintenance task (which may include the downtime of the equipment 100 and/or the time to perform the maintenance task). More specifically, the pre-emptive maintenance data may include one or more of the following:

i. the component to be replaced when its corresponding component fails according to the mathematical model;

ii. whether the components and tools necessary to perform a preemptive repair corresponding to the failure detected by the mathematical model are in inventory or, if not, the lead time to obtain such components and tools (generally, the availability of the tools and components);

iii. the total cost of the components to be replaced in a preemptive repair (such as the cost of a replacement component);

iv. the total equipment 100 downtime required for the preemptive repair;

v. the cost per unit of downtime (lost production by taking the equipment out of service);

vi. the cost of maintenance labor to perform the task; and/or vii. the expected cost incurred if a failure occurs before the preemptive repair is performed.

At the same time as, before, and/or after steps 205 and/or 210, at step 215, the method may include collecting preventive maintenance data for one or more future scheduled preventive maintenance tasks. For example, the preventive maintenance data may include similar data as the pre-emptive maintenance data, or different data from the pre-emptive maintenance data. In some embodiments, the preventive maintenance data includes the content of the maintenance task (such as the type of maintenance work to be performed), the costs associated with the maintenance task (such as parts and labor), and/or the time associated with the maintenance task (which may include the downtime of the equipment 100 and/or the time to perform the maintenance task). More specifically, the preventive maintenance data may include one or more of the following:

i. the component(s) to be replaced;

ii. whether each component is in inventory (availability of each component);

iii. the total cost of the component(s) to be replaced;

iv. the time the scheduled maintenance task was last performed;

v. the total downtime required for the scheduled maintenance task;

vi. the cost per unit of downtime (lost production by taking the equipment out of service);

vii. the cost of maintenance labor to perform the task; and/or viii. the expected cost per each time unit of delay past the scheduled time for completing the task (such as incremental damage, risk of failure multiplied by the cost of failure).

At the same time as, before, and/or after steps 210 and/or 215, at step 220, the method 200 includes applying the mathematical models M1, M2, Mn, etc., developed in step 205 to predict or estimate the time of failure of one or more components 110 of the equipment. For example, step 220 may include receiving component data about the components, such as sensor data (for example, from the sensors 120 illustrated in FIG. 1) and/or inspection data associated with characteristics of each component, applying the mathematical models from step 205 to the component data, and calculating a time value of when each component 110 will fail (such as a specific time value and/or a predicted distribution of time, as described above).

Next, at step 225, the method 200 includes analyzing the pre-emptive maintenance data collected in step 210, the preventive maintenance data collected in step 215, and the time value of component failure from step 220 to compute a time (such as an optimal time) to complete the next maintenance event (which may include a combination of one or more pre-emptive tasks and/or one or more preventive maintenance tasks). At step 225, the method 200 also includes determining which tasks (such as which pre-emptive repairs or preventive maintenance tasks) should be performed during that next maintenance event. In some embodiments, the analysis to determine the time and content of the next maintenance event includes linear programming, stochastic programming (such as Markov Decision Processes or other stochastic modeling processes), and/or other programming (additional representative programming processes that may be implemented in various embodiments are described below in connection with the Optimal Time Computation Module 550).

In some embodiments, the total cost of a maintenance event involving multiple repairs (for example, both pre-emptive and preventive repair tasks) includes a single set-up event (such as a single trip to a garage or a single removal of a larger component to access sub-components). In such embodiments, the analysis in step 225 may seek to minimize the total cost. In some embodiments, determining the time to complete the next maintenance event includes factors such as the availability of components, maintenance personnel, and space for performing the repairs. Each of these factors may be input into the analysis models and/or algorithms in step 225.

To further reduce (such as minimize) costs or losses associated with replacing a component before its useful life is complete, the analysis and modeling in step 225 may include a mathematical representation of the component's useful life lost due to early replacement. For example, if a component is replaced at 450 hours of use instead of its usual 500 hours of use, then the modeling and analysis in step 225 may reflect an increase of 10% in the total cost of the maintenance event in which that component is replaced (corresponding to the 50 hours lost out of the potential 500-hour lifespan). Accordingly, as the method 200 seeks to minimize total costs, the losses associated with premature replacement are considered.

Next, at step 230, the time to complete the next maintenance event (determined in step 225) is input to a timetable system, such as an electronic calendar system, for a user to view the maintenance event on the timetable. The content of the maintenance event (also determined in step 225) may also be input into the timetable system and associated with the time, so that a user may use the time and content of the maintenance event to perform the maintenance at the time suggested by the method 200. In some embodiments, the analysis in step 225 can include determining one or more additional pre-emptive and/or preventive maintenance tasks to perform at the time of the next maintenance event (determined in step 225), and those additional tasks may be added to the timetable system in step 230.

The method 200 may include repeating steps 220, 225, and/or 230 at selected increments of time to continually or periodically update the time to complete the next maintenance event. If some or all maintenance actions of the next maintenance event are performed, the method 200 may include returning to any one or more of steps 205, 210 and 220 to update the models, the pre-emptive maintenance data, the preventive maintenance data, the estimated or predicted time of component failure, and the resulting time and content of a maintenance event in step 225. In some embodiments, the method 200 may include repeating one or more steps of the method 200 when a sensor 120 outputs data associated with an impending failure. For example, a controller running the method 200 may include instructions that trigger repeating one or more steps of the method 200 when a sensor 120 provides data to the controller that represents a critical value, such as low oil, impending fracture, or another critical value associated with impending failure of the component.

In some embodiments, a result of the method 200 and systems implementing the method 200 is that an end-user, owner, or other entity associated with the equipment 100 has an automatically-generated schedule of maintenance events for the equipment 100 that minimizes total costs.

In further embodiments, the method 200 may indicate a priority level for each maintenance action based, such as "must do," "recommended," "if needed after inspection," or "optional" (optional priority levels may be associated with non-critical parts, for example). Accordingly, in some embodiments, the component data may include a criticality factor and the modeling processes may generate the priority level based at least in part on the criticality factor.

In some embodiments, method 200 may generate the schedule of maintenance events in a way to optimize completion based on logical order of maintenance actions or part availability. For example, change the oil before changing the oil filter, and/or use Part B in the event Part A is not available. In some embodiments, the output of the method 200 includes scheduling of diagnostic events to assist with diagnosing a root cause of a predicted failure, such as scheduling an operator to check for leaks in a hose, and if no leaks are found, then checking a valve, and if the valve is in working condition, checking other components. In some embodiments, the mathematical models may diagnose a failure mode and schedule specific steps to address or fix the failure. In some embodiments, the output of the method 200 includes determining a time or scheduling a time for an inspection action to collect inspection data (e.g., inspection of components that are not analyzed by sensors or to otherwise collect inspection data that is not available from sensors). Component data may include inspection data and sensor data, so systems and methods configured in accordance with embodiments of the present technology may use inspection data in a similar manner as the sensor data (that is, the inspection data may be input into the models to inform the scheduling and content of the next maintenance event).

In some embodiments, the one or more components associated with a predicted future failure time (e.g., the component associated with a pre-emptive maintenance action) may be the same component associated with a scheduled maintenance action (e.g., preventive maintenance). For example, equipment engine oil may be a component that the sensors report as low, calling for a pre-emptive maintenance action. The same engine oil may have a scheduled or preventive maintenance action that is also due at a future time. The method 200 may generate a schedule of maintenance events that calls for changing or supplementing the engine oil prior to a scheduled oil change (i.e., prior to a preventive maintenance event).

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 3:
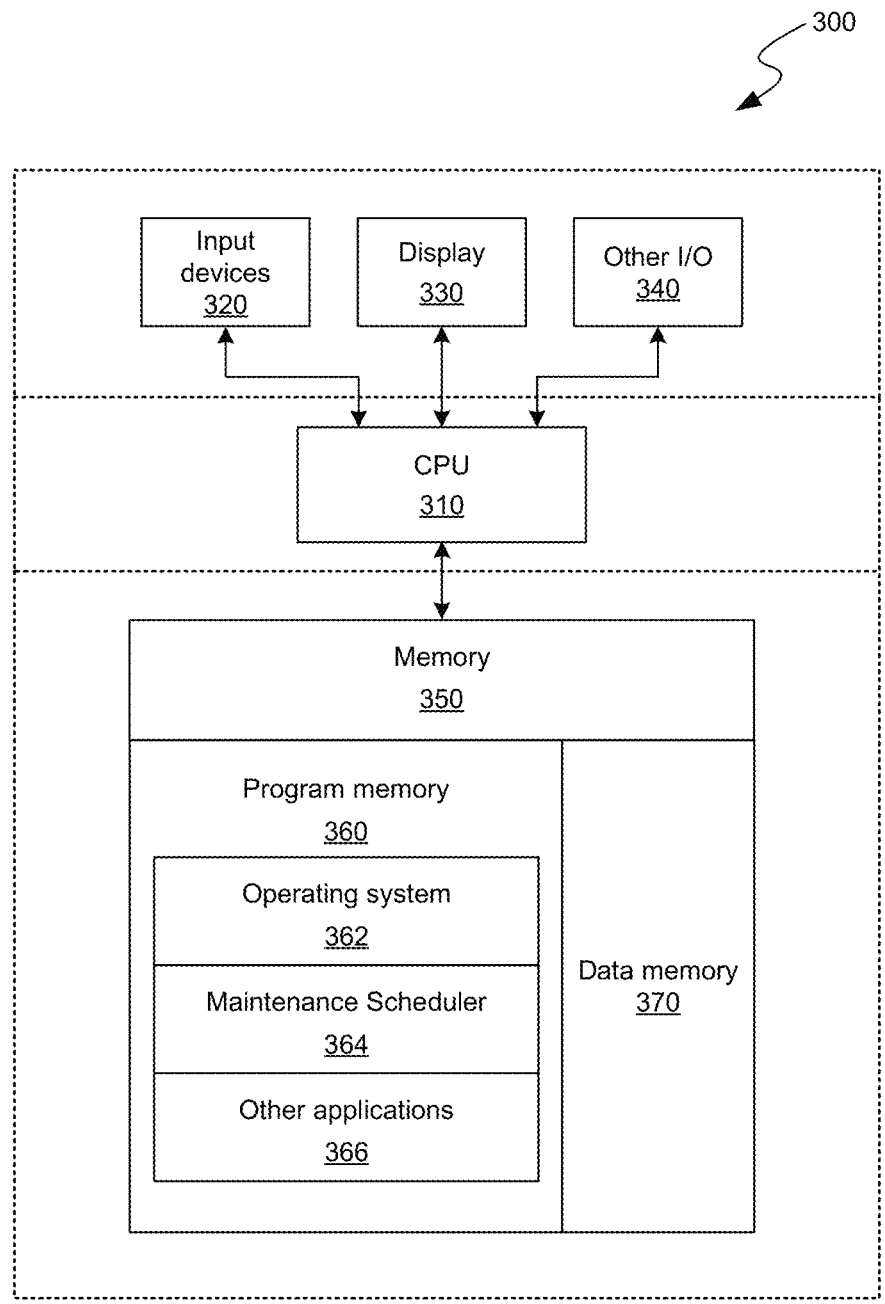
FIG. 3 is a block diagram illustrating an overview of devices on which some implementations can operate.

Several implementations are discussed below in more detail in reference to the figures. FIG. 3 is a block diagram illustrating an overview of devices on which some implementations of the disclosed technology can operate. The devices can comprise hardware components of a system 300 that performs scheduling of maintenance, for example. Device 300 can include one or more input devices 320 that provide input to the CPU (processor) 310, notifying it of actions. The actions are typically mediated by a hardware controller that interprets the signals received from the input device and communicates the information to the CPU 310 using a communication protocol. Input devices 320 include, for example, a mouse, a keyboard, a touchscreen, an infrared sensor, a touchpad, a wearable input device, a camera- or image-based input device, a microphone, or other user input devices.

CPU 310 can be a single processing unit or multiple processing units in a device or distributed across multiple devices. CPU 310 can be coupled to other hardware devices, for example, with the use of a bus, such as a PCI bus or SCSI bus. The CPU 310 can communicate with a hardware controller for devices, such as for a display 330. Display 330 can be used to display text and graphics. In some examples, display 330 provides graphical and textual visual feedback to a user. In some implementations, display 330 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 340 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 300 also includes a communication device capable of communicating wirelessly or wire-based with a network node. The communication device can communicate with another device or a server through a network using, for example, TCP/IP protocols. Device 300 can utilize the communication device to distribute operations across multiple network devices.

The CPU 310 can have access to a memory 350. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 350 can include program memory 360 that stores programs and software, such as an operating system 362, Maintenance Scheduler 364 (which may include instructions for carrying out the methods of scheduling maintenance disclosed herein), and other application programs 366. Memory 350 can also include data memory 370 that can include database information, etc., which can be provided to the program memory 360 or any element of the device 300.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 4:
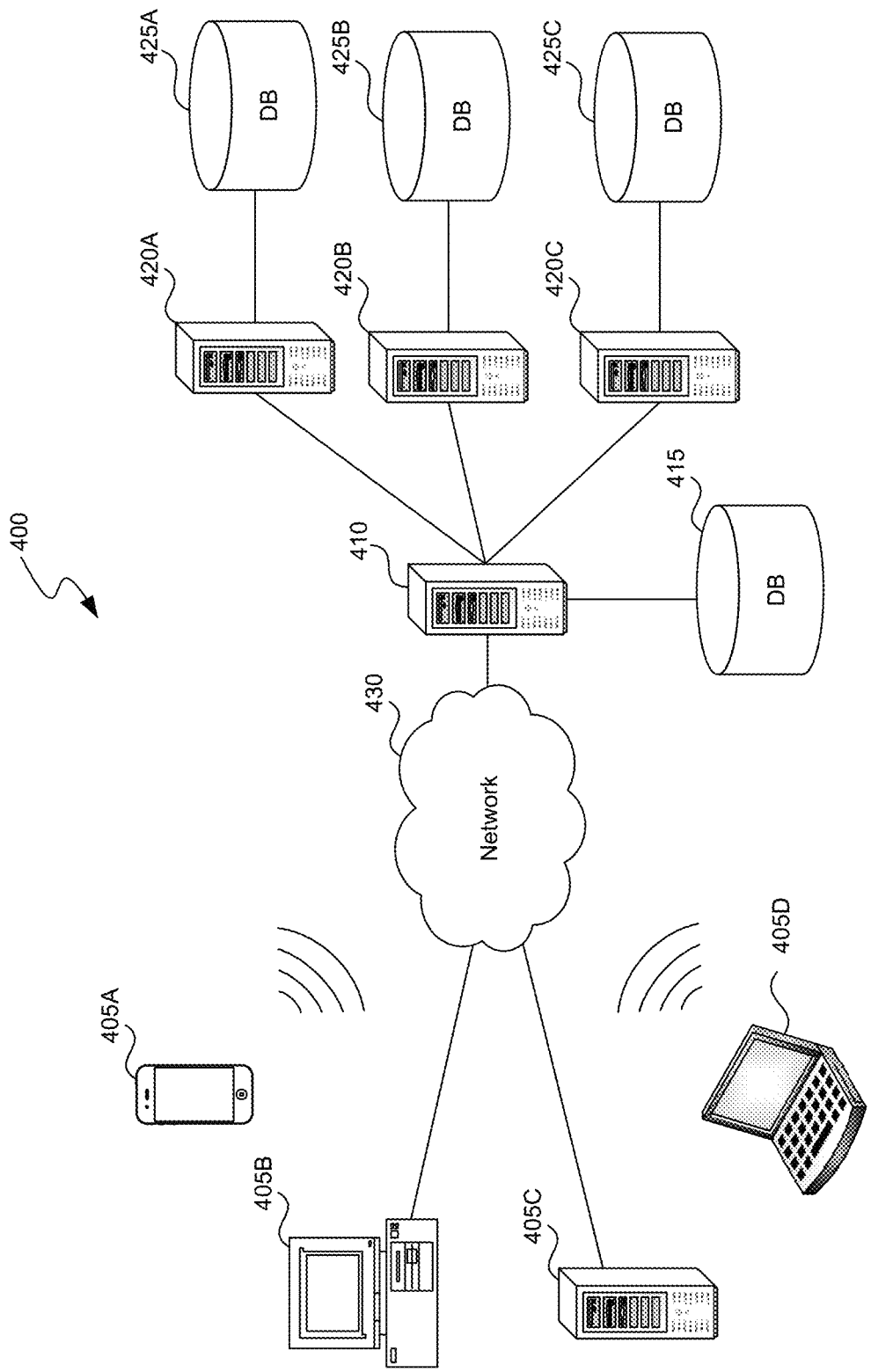
FIG. 4 is a block diagram illustrating an overview of an environment in which some implementations can operate.

FIG. 4 is a block diagram illustrating an overview of an environment 400 in which some implementations of the disclosed technology can operate. Environment 400 can include one or more client computing devices 405A-D, examples of which can include device 300. Client computing devices 405 can operate in a networked environment using logical connections through network 430 to one or more remote computers, such as a server computing device 410.

In some implementations, server computing device 410 can be an edge server that receives client requests and coordinates fulfillment of those requests through other servers, such as servers 420A-C. Server computing devices 410 and 420 can comprise computing systems, such as device 300. Though each server computing device 410 and 420 is displayed logically as a single server, server computing devices can each be a distributed computing environment encompassing multiple computing devices located at the same or at geographically disparate physical locations. In some implementations, each server computing device 420 corresponds to a group of servers.

Client computing devices 405 and server computing devices 410 and 420 can each act as a server or client to other server/client devices. Server 410 can connect to a database 415. Servers 420A-C can each connect to a corresponding database 425A-C. As discussed above, each server 420 can correspond to a group of servers, and each of these servers can share a database or can have their own database. Databases 415 and 425 can warehouse (e.g., store) information. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN), but can also be other wired or wireless networks. Network 430 may be the Internet or some other public or private network. Client computing devices 405 can be connected to network 430 through a network interface, such as by wired or wireless communication. While the connections between server 410 and servers 420 are shown as separate connections, these connections can be any kind of local, wide area, wired, or wireless network, including network 430 or a separate public or private network.

Figure 5:
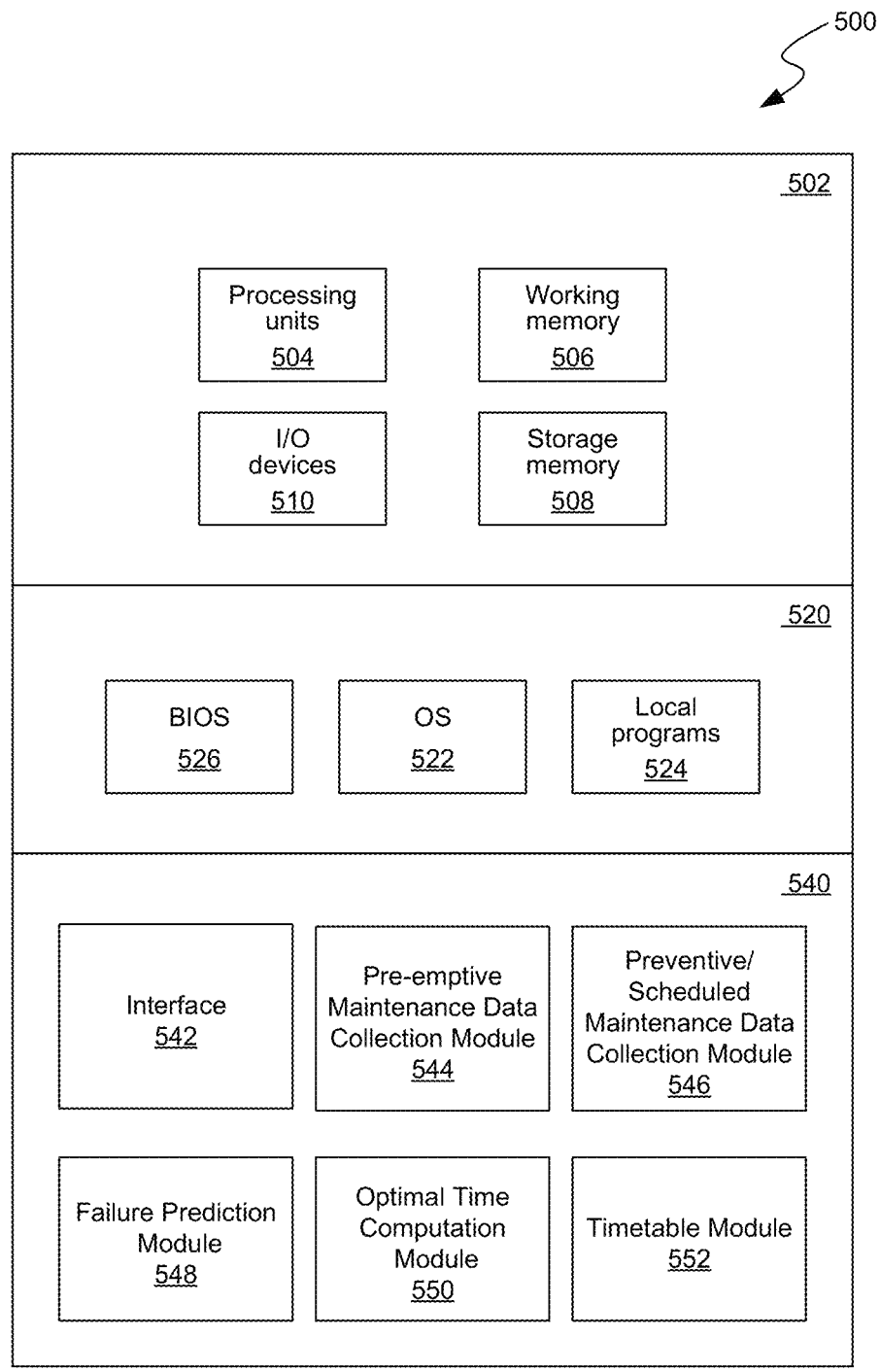
FIG. 5 is a block diagram illustrating elements which, in some implementations, can be used in a system employing the disclosed technology.

FIG. 5 is a block diagram illustrating elements 500 which, in some implementations, can be used in a system employing the disclosed technology. The elements 500 include hardware 502, general software 520, and specialized elements 540. As discussed above, a system implementing the disclosed technology can use various hardware, including processing units 504 (e.g., CPUs, GPUs, APUs, etc.), working memory 506, storage memory 508, and input and output devices 510. Elements 500 can be implemented in a client computing device such as client computing devices 405 or on a server computing device, such as server computing device 410 or 420.

General software 520 can include various applications, including an operating system 522, local programs 524, and a basic input output system (BIOS) 526. Specialized components 540 can be subcomponents of a general software application 520, such as local programs 524, which may include the Maintenance Scheduler 364 (see FIG. 3 and description above). Specialized elements 540 can include a Pre-emptive Maintenance Data Collection Module 544, a Preventive/Scheduled Maintenance Data Collection Module 546, a Failure Prediction Module 548, an Optimal Time Computation Module 550, a Timetable Module 552, and components that can be used for transferring data and controlling the specialized components, such as interface 542. In some implementations, elements 500 can be in a computing system that is distributed across multiple computing devices or can be an interface to a server-based application executing one or more of specialized elements 540.

Those skilled in the art will appreciate that the components illustrated in FIGS. 3-5 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, systems for scheduling maintenance of equipment can include a Pre-emptive Maintenance Data Collection Module 544, a Preventive/Scheduled Maintenance Data Collection Module 546, a Failure Prediction Module 548, an Optimal Time Computation Module 550, and a Timetable Module 552 (FIG. 7).

In operation, the Pre-emptive Maintenance Data Collection Module 544 collects and stores the pre-emptive maintenance data (see step 210 in FIG. 2). The Preventive/Scheduled Maintenance Data Collection Module 546 collects and stores the preventive maintenance data (see step 215 in FIG. 2). The Failure Prediction Module 548 may include the mathematical models M1, M2, Mn, etc. and applies the models to the component data to predict or estimate the time of failure of one or more components (see step 220 in FIG. 2).

The Optimal Time Computation Module 550 analyzes the pre-emptive maintenance data, the preventive maintenance data, and the time of failure of a component to compute a time (such as an optimal time) to complete the next maintenance event (which may include a combination of one or more pre-emptive tasks and/or one or more preventive maintenance tasks) (see step 225 in FIG. 2). The Optimal Time Computation Module 550 also determines which tasks (such as which pre-emptive repairs or preventive maintenance tasks) should be performed during that next maintenance event (as explained above with regard to step 225 in FIG. 2). In some embodiments, the Optimal Time Computation Module 550 includes linear programming, stochastic programming (such as Markov Decision Processes), dynamic programming, convex programming, quadratic programming, global optimization programming, simulated annealing, genetic algorithms, optimization by simulation, and/or other suitable techniques for computing the time value of a maintenance event or action.

The Timetable Module 552 may include a timetable system, such an electronic calendar system, and/or an instructions configured to add time and content information to another timetable or electronic calendar system. The Timetable Module 552 may facilitate step 230 in FIG. 2.

General software 520 (see FIG. 5) may include instructions to repeat steps 220, 225, 230 and/or other steps of the method 200 (see FIG. 2) at selected increments of time to continually or periodically update the time to complete the next maintenance event and/or the content (e.g., types of maintenance tasks) of the next maintenance event. In some embodiments, the method 200 may include repeating steps 220, 225, 230, and/or other steps when sensor data indicates a new potential pre-emptive maintenance activity (e.g, when sensor data indicates an impending failure such as low oil or a malfunctioning component; the sensor data may include flag data that is input into one or more software elements to trigger repeating of the method or one or more steps of the method).

The disclosed technology, therefore, provides automatic (e.g., optimal) scheduling of maintenance of equipment, thereby reducing (e.g., minimizing) costs associated with maintaining equipment. In particular, the disclosed technology accounts for losses associated with performing preventive maintenance tasks early when determining scheduling of maintenance of equipment.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the term "and/or" when used in the phrase "A and/or B" means "A, or B, or both A and B." A similar manner of interpretation applies to the term "and/or" when used in a list of more than two terms.

What is claimed is:

1. A method for scheduling maintenance of equipment, the method comprising:
    (a) developing, by a processor, one or more mathematical models, wherein the one or more mathematical models predict a failure time value associated with a future failure of a first component of equipment based on first component data associated with the first component;
    (b) collecting, by a sensor monitoring the first component, pre-emptive maintenance data associated with a pre-emptive maintenance task associated with the first component,
        wherein the pre-emptive maintenance data includes a flag configured to indicate an impending failure of the first component;
    (c) collecting preventive maintenance data associated with a preventive maintenance task, wherein the preventive maintenance data comprises costs associated with replacing a second component prior to the preventive maintenance task;
    (d) applying, by the processor, the one or more mathematical models to component data to predict the failure time value associated with the future failure of the first component;
    (e) analyzing, by the processor, the pre-emptive maintenance data, the preventive maintenance data, and the failure time value to determine an optimal time to perform a maintenance event that includes the preventive maintenance task and the pre-emptive maintenance task; and
    determining, by the processor, whether the flag indicates the impending failure of the first component;
    upon determining the flag indicates impending failure of the first component, periodically repeat steps (a)-(e);
    inputting, by the processor, the optimal time to a timetable system to schedule next maintenance event;
    wherein determining the optimal time comprises minimizing a total cost of the maintenance.

2. The method of claim 1, wherein developing the one or more mathematical models comprises developing a plurality of mathematical models, each mathematical model being representative of a failure mode of the first component.

3. The method of claim 1, wherein the one or more mathematical models include rule-based models or machine learning models.

4. The method of claim 1, wherein the pre-emptive maintenance data comprises:
    cost of a replacement component for replacing the first component;
    cost of labor to perform pre-emptive maintenance associated with the replacement component;
    availability of the replacement component;
    availability of tools necessary for the pre-emptive maintenance;
    amount of downtime necessary for the pre-emptive maintenance;
    cost of downtime necessary for the pre-emptive maintenance; or
    cost associated with an event of failure of the first component occurring before the pre-emptive maintenance.

5. The method of claim 1, wherein the preventive maintenance data further comprises:
    availability of preventive maintenance components associated with the preventive maintenance task;
    cost of the preventive maintenance components;
    time since the preventive maintenance task was performed;
    amount of downtime necessary for the preventive maintenance task;
    cost of downtime necessary for the preventive maintenance task;
    cost of labor to perform the preventive maintenance task; or
    expected cost of delay to perform the preventive maintenance task after a scheduled time.

6. The method of claim 1, wherein the first component data comprises inspection data from inspection of characteristics of the first component or sensor data from sensing characteristics of the first component.

7. The method of claim 1, wherein analyzing the pre-emptive maintenance data, the preventive maintenance data, and the failure time value further comprises determining one or more additional pre-emptive maintenance tasks to perform at the optimal time.

8. The method of claim 1, wherein analyzing the pre-emptive maintenance data, the preventive maintenance data, and the failure time value comprises analysis using linear programming, stochastic programming, dynamic programming, convex programming, quadratic programming, global optimization, simulated annealing, and/or genetic algorithms.

9. The method of claim 1, further comprising repeating the analyzing.

10. The method of claim 1, wherein the first component and the second component are the same type of component.

11. A system for scheduling maintenance of equipment, comprising:
- one or more processors; and
- one or more memory devices having stored thereon instructions that when executed by the one or more processors cause the one or more processors to:
    - (a) collect, by a sensor monitoring a first component of the equipment, component data associated with the first component of the equipment;
    - (b) collect, by the sensor monitoring the first component, pre-emptive maintenance data associated with a pre-emptive maintenance task associated with the first component,
        - wherein the pre-emptive maintenance data includes a flag configured to indicate an impending failure of the first component;
    - (c) collect preventive maintenance data associated with a preventive maintenance task, wherein the preventive maintenance data comprises costs associated with replacing a second component prior to the preventive maintenance task;
    - (d) apply, by a processor among the one or more processors, one or more mathematical models to the component data, wherein the one or more mathematical models predict a failure time value associated with a future failure of the first component based on the component data;
    - (e) analyze, by the processor, the pre-emptive maintenance data, the preventive maintenance data, and the failure time value to determine an optimal time to perform a maintenance event that includes the preventive maintenance task and the pre-emptive maintenance task; and
    - determining, by the processor, whether the flag indicates the impending failure of the first component;
    - upon determining the flag indicates the impending failure of the first component, periodically repeat steps (a)-(e);
    - input, by the processor, the optimal time to a timetable system to schedule next maintenance event;
    - wherein determining the optimal time comprises minimizing a total cost of the maintenance.

12. The system of claim 11, wherein the pre-emptive maintenance data comprises:
- cost of a replacement component for replacing the first component;
- cost of labor to perform pre-emptive maintenance associated with the replacement component;
- availability of the replacement component;
- availability of tools necessary for the pre-emptive maintenance;
- amount of downtime necessary for the pre-emptive maintenance;
- cost of downtime necessary for the pre-emptive maintenance; or
- cost associated with an event of failure of the first component occurring before the pre-emptive maintenance.

13. The system of claim 11, wherein the preventive maintenance data further comprises:
- availability of preventive maintenance components associated with the preventive maintenance task;
- cost of the preventive maintenance components;
- time since the preventive maintenance task was performed;
- amount of downtime necessary for the preventive maintenance task;
- cost of downtime necessary for the preventive maintenance task;
- cost of labor to perform the preventive maintenance task; or
- expected cost of delay to perform the preventive maintenance task after a scheduled time.

14. The system of claim 11, wherein the component data comprises inspection data from inspection of characteristics of the first component or sensor data from sensing characteristics of the first component.

15. The system of claim 11, wherein the first component and the second component are the same type of component.

16. One or more non-transitory computer-readable media storing computer-executable instructions that, when executed by one or more processors, cause the one or more processors to perform operations comprising:
- (a) collecting, by a sensor monitoring a first component of an equipment, component data associated with the first component of the equipment;
- (b) collecting, by the sensor monitoring the first component, pre-emptive maintenance data associated with a pre-emptive maintenance task associated with the first component,
    - wherein the pre-emptive maintenance data includes a flag configured to indicate an impending failure of the first component;
- (c) collecting preventive maintenance data associated with a preventive maintenance task, wherein the preventive maintenance data comprises costs associated with replacing a second component prior to the preventive maintenance task;
- (d) applying, by a processor among the one or more processors, one or more mathematical models to the component data, wherein the one or more mathematical models predict a failure time value associated with a future failure of the first component based on the component data;
- (e) analyzing, by the processor, the pre-emptive maintenance data, the preventive maintenance data, and the failure time value to determine an optimal time to perform a maintenance event that includes the preventive maintenance task and the pre-emptive maintenance task; and
- determining, by the processor, whether the flag indicates the impending failure of the first component;
- upon determining the flag indicates the impending failure of the first component, periodically repeat steps (a)-(e);
- inputting, by the processor, the optimal time to a timetable system to schedule next maintenance event;
- wherein determining the optimal time comprises minimizing a total cost of maintenance.

17. The one or more non-transitory computer-readable media of claim 16, further storing the one or more mathematical models.

18. The one or more non-transitory computer-readable media of claim 16, wherein the component data comprises inspection data from inspection of characteristics of the first component or sensor data from sensing characteristics of the first component.

19. The one or more non-transitory computer-readable media of claim 18, wherein the operations further comprise repeating the analyzing when the maintenance event, the preventive maintenance task, or the pre-emptive maintenance task is performed, or in response to the sensor data having data corresponding to the impending failure.

20. The one or more non-transitory computer-readable media of claim 16, wherein analyzing the pre-emptive maintenance data, the preventive maintenance data, and the failure time value further comprises determining one or more additional pre-emptive maintenance tasks to perform at the optimal time.

21. The one or more non-transitory computer-readable media of claim 16, wherein upon determining the flag indicates impending failure of the first component, periodically repeat steps (a)-(e) includes:
   upon determining the flag indicates impending failure of the first component, increasing a frequency of performing steps (a)-(e).

\* \* \* \* \*